June 2, 1953 F. F. KORS 2,640,721
COLLAPSIBLE AUTO TRAILER
Filed Sept. 5, 1947 3 Sheets-Sheet 2
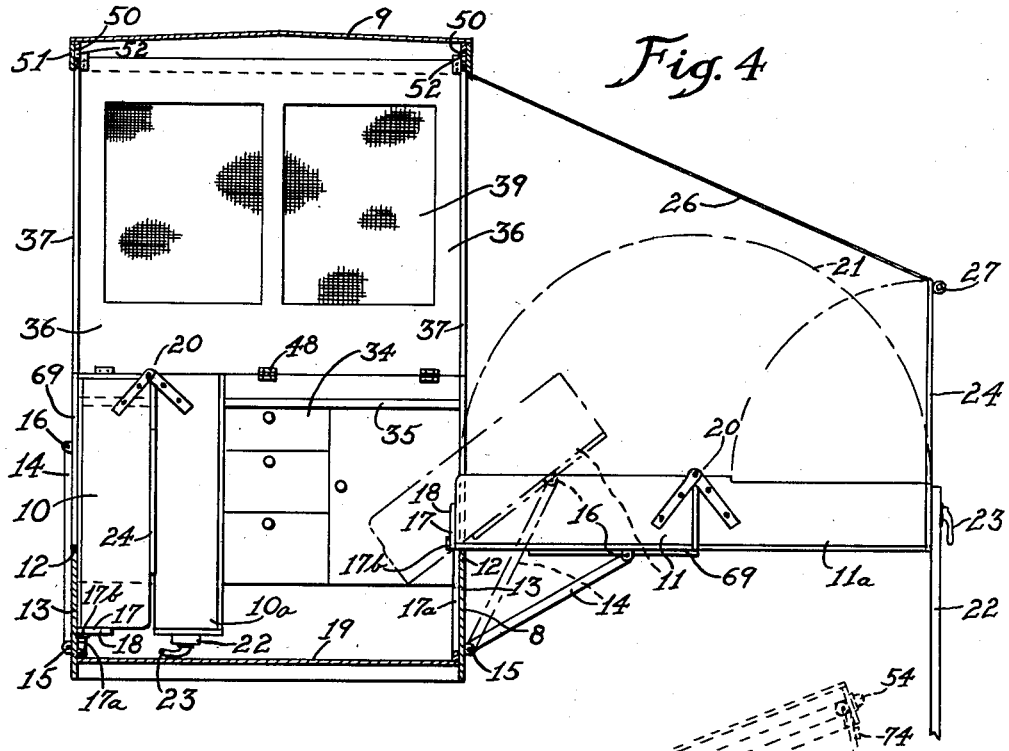
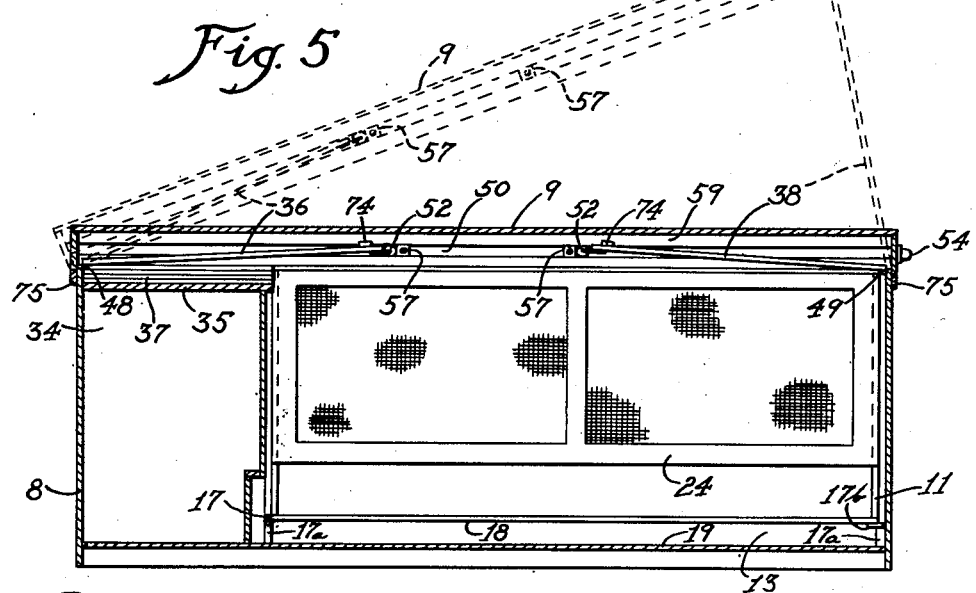
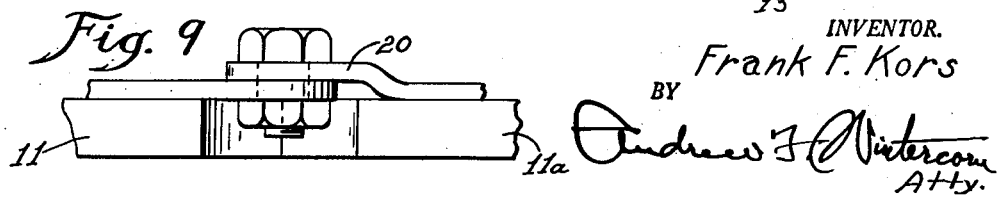
INVENTOR.
Frank F. Kors

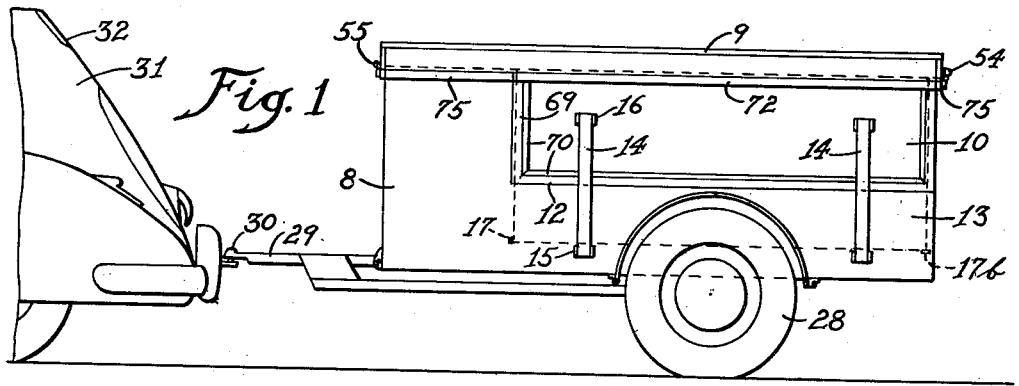
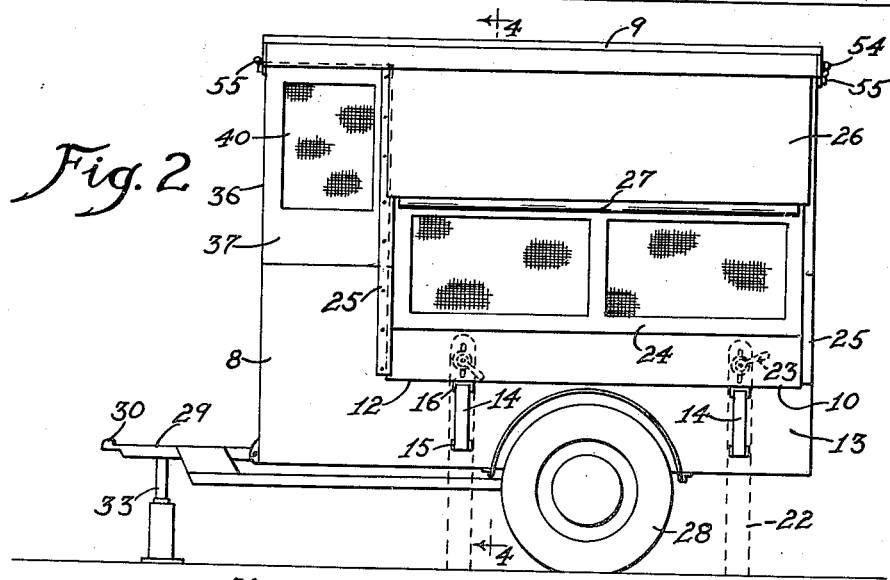
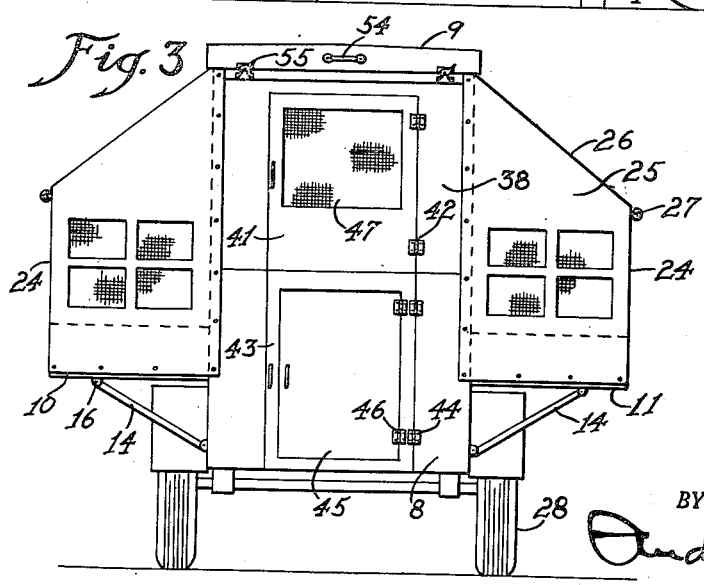

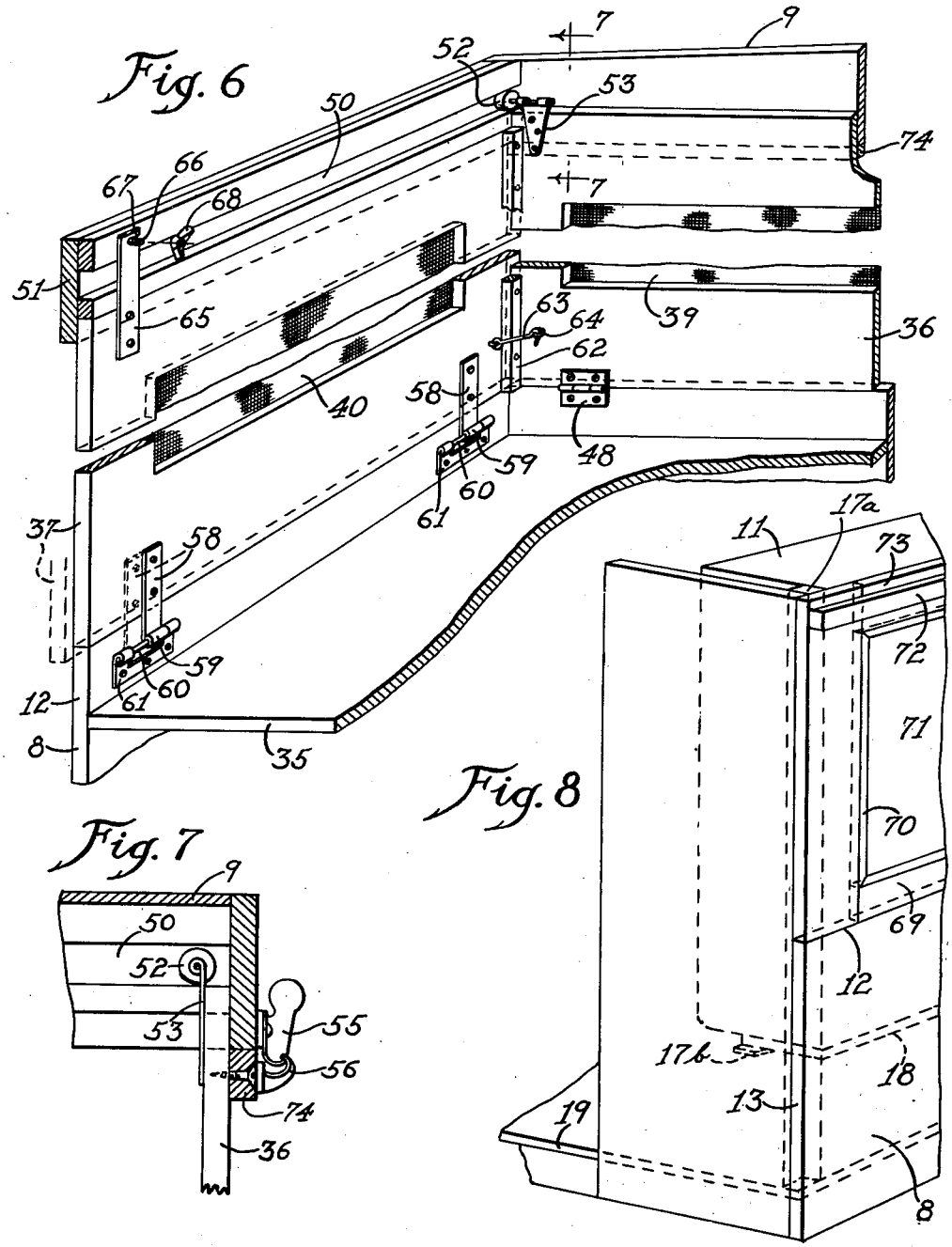

Patented June 2, 1953

2,640,721

UNITED STATES PATENT OFFICE 2,640,721

COLLAPSIBLE AUTO TRAILER

Frank F. Kors, Independence, Kans., assignor of one-half to Harry D. Kors, Independence, Kans.

Application September 5, 1947, Serial No. 772,349

13 Claims. (Cl. 296—23)

This invention relates to an improved collapsible or foldable house-type trailer structure of the type disclosed in my earlier Patent No. 2,182,967, issued December 12, 1939, which, in its folded condition, has a low center of gravity and, hence, better roadability and also unobstructed rear vision over the trailer from the car to which it is attached.

One of the principal objects of my invention is to provide a structure of the kind mentioned having a top raisable from a low position directly over the body to house-type trailer height, end wall members being hinged to the ends of the body and raisable to vertical position for support of the top at its opposite ends, and side wall members being hinged to the sides of the body and also slidable endwise so that when raised to vertical position for support of the top these side members may be slid into abutment with the side portions of the end members and detachably connected therewith in rigid relationship for the firm support of the top, the end members being connected to the top by rollers operating in raceways, and the side members having slotted attachment plates on the inner top portions thereof which, when the side members are slid home endwise, receive bolts on the top so that the top can be clamped securely to the side members in final assembled relationship. Other quickly attachable and detachable fasteners are preferably provided between the top and end members on the outer sides of the latter to further insure the desired rigidity of the structure.

Another important object of the present invention is to provide a trailer structure of the collapsible or foldable type having bed frames slidable in cut-out portions on the side walls of the body to and from extended horizontal positions for use, these bed frames having stop projections on their inner ends for abutment with the side walls of the body to provide some support for the bed frames, the rest of the support being provided by props that are hinged at one end to the side walls of the body and at the other end to the outer bottom portions of the bed frames, whereby to be foldable inwardly against the body when the bed frames are raised and slid inwardly to their upright folded positions within the body, said props being swingable outwardly with the bed frames to inclined operative position automatically when the bed frames are pulled out for use. This construction is used in single and double bed designs, double beds merely involving the provision of a duplicate bed frame hingedly connected at the inner top corners to the outer top corners of the first bed frame so as to be foldable on top of the latter and unfoldable to coplanar relationship therewith, separate prop means being adjustably connected to the outer end of the second bed frame to extend downwardly therefrom and rest on the ground for supplementary support, the foldable props first mentioned also assuming some of the load.

The invention is illustrated in the accompanying drawings, in which—

Fig. 1 is a side view of a trailer made in accordance with my invention as it appears when folded, ready for travel, the same being shown coupled to the rear end of an automobile for towing;

Figs. 2 and 3 are a side and rear view, respectively, of the same trailer as it appears when set up for use;

Fig. 4 is a cross-section through the body taken on the line 4—4 of Fig. 2, but showing two bed frames on each side, the frames on one side being shown folded and the frames on the other side being shown unfolded and ready for use;

Fig. 5 is a longitudinal section through the body, showing the top down in full lines, and indicating in dotted lines how the top is arranged to be raised, one end at a time;

Fig. 6 is a perspective of the left front corner portion of the trailer, with intermediate portions of the front end member and left side member broken away to conserve space and permit showing the parts on a larger scale;

Fig. 7 is a sectional detail on the line 7—7 of Fig. 6, looking in the direction indicated by the arrows;

Fig. 8 is a fragmentary perspective view of one rear corner of the trailer showing how the backs of the bed frames form closure panels for the openings in the sides of the trailer body, and Fig. 9 is a plan view of one of the hinges connecting the two sections of the double bed shown in Fig. 4.

The same reference numerals are applied to corresponding parts throughout the views.

Referring first mainly to Figs. 1-4, the reference numeral 8 designates the trailer body and 9 its raisable top, which covers and shelters the trailer body and contents and serves to lock-in the outwardly foldable bed frames 10 and 11 in their folded position. These bed frames are slidable in cut-out notches or openings 12 provided therefor in the side walls 13 of the body 8, and are linked to said side walls, each by means of a pair of props 14. Each prop is hingedly connected to the side wall at one end, as at 15, and is hingedly connected at its other end to the bottom of the bed frame, as at 16. When the beds are folded into the body, the vertically disposed props 14 support the beds in vertical positions in abutment with the inner side of the side walls 13, while the props bear against the outer side, as shown at the left in Fig. 4, but when the beds are extended outwardly for use, they rest at their inner ends on the side walls 13 in the cut-out notches 12, and are supported near their outer ends by props 14. A stop projection 17, defined by one projecting end of a cross-piece 18 on the inner end of the bed frames, and a plate 17b projecting from the other end, serve to limit outward movement of each of the beds by engagement with stop rails 17a provided on the side walls of the body, and serve also to assume a portion of the load in the supporting of the beds in extended position. The beds are stored lengthwise of the body 8, and are extended sidewise to operative position for use. This makes for a simpler and more economical construction than that shown in my earlier patent, as should appear from this much description. Besides, it makes for easier folding and unfolding of the beds, and makes available a commodious storage space in the body between the folded beds from floor 19 to top 9 for storage of supplies and the many odds and ends needed in traveling and camping with a trailer. This arrangement also has the advantage of flexibility in production of trailers from the standpoint that the one body size is adapted to carry either two single beds, or two double beds, or one single and one double bed, without any changes in the body proper. Thus, in Fig. 4, a second bed frame 10a is shown hingedly connected to 10 at 20, and a second bed frame 11a is shown hingedly connected to 11 at 20, these second beds being unfolded, as indicated by the dotted arc 21, and supported in their extended positions mainly from the outer ends of the first beds and partly by props 22 that are arranged to be adjustably clamped, as at 23, to the outer ends of the second beds to support these beds by engagement at their lower ends on the ground. When the second bed frames 10a and 11a are omitted, the trailer structure, when set up for use, appears as shown in Fig. 3. The hinges 20 are preferably strap hinges, as illustrated in Fig. 9, having their pivot pintles located at the exact corners of the adjoining bed frames, so that the bed frames are foldable directly on top of one another and will hang neatly in folded position, as shown at the left in Fig. 4. The props 22 are similar to what were disclosed in my earlier patent and are adapted to be folded into positions extending lengthwise of the beds when not in use, so that they can be stored readily inside the body 8 with the beds, as indicated at the left in Fig. 4. While the props 22 are ordinarily omitted on single bed frames, they may be provided, as indicated in dotted lines in Fig. 2, to supplement the support afforded by props 14. There is a side enclosure 24 on each single or double bed, in the form of a screen covered frame suitably hinged to the upper edge of the bed frame and arranged to be raised to vertical position, as appears in Figs. 2, 3, and 4, and each single or double bed also has awnings to provide end closures 25 and inclined tops 26, whereby to completely enclose the beds on three sides, leaving the fourth side open to the interior of the trailer. Awnings or drop curtains 27 may be lowered to cover the screens 24.

When folded, ready for travel, the trailer appears as shown in Fig. 1. The trailer body is suitably supported at about its middle on a pair of wheels 28, and has a tongue 29 projecting from the front end, which is equipped with a coupler socket 30, adapted to make detachable swivel connection with a ball-head carried on the rear end of the automobile 31, thereby supporting the front end of the trailer in a predetermined elevated relation to the road. The trailer when folded and closed up, ready for the road, is low enough in relation to the rear window 32 of the car to afford unobstructed rear vision for the driver, which, of course, is quite an advantage from the safety standpoint. A suitable jack 33 provides support for the front end of the trailer when uncoupled from the car.

A cupboard section 34 is provided in the front end of the trailer body 8 extending nearly the full height of said body, leaving enough room above the working top 35 thereof for storage below the top 9 in its lowered position for the hinged front end closure 36 and hinged side closures 37 in their folded or collapsed position. The side closures 37 extend lengthwise of the body only the depth dimension of the cupboards 34, so that their rear edges lie flush with the front of the cut-out 12 in which the beds operate. There is also a rear end hinged closure 38, which, like the front end closure 36, extends the full width of the body 8, and, whereas the front end closure has screened openings 39, like the screened openings 40 in the side closures, the rear end closure has an upper door section 41 hinged in an opening therein, as shown at 42 in Fig. 3. This door section 41 is arranged to be suitably secured to a lower door section 43 that is hinged, as at 44, in an opening in the rear wall of the body 8, whereby to provide a full height two-section door that may be opened and closed as a unit. A separate panel 45 is hinged, as at 46, in the lower door section 43, to afford access to the storage space when the trailer is folded. The upper door section 41 may have a screened opening 47, as also appears in Fig. 3. Hinges are indicated at 48 in Figs. 4 and 6 for hingedly connecting the front end closure 36 to the front end of the body 8 to permit folding this closure 36 inwardly toward a substantially horizontal position, as shown in Fig. 5, and there are corresponding hinges 49, as indicated in Fig. 5, for hingedly connecting the rear end closure 38 to the rear end of the body to fold inwardly in a similar manner. Now, there are roller raceways 50 provided in the side portions 51 of the top 9 extending lengthwise of the top on both sides, and rollers 52 are mounted on the upper ends of the front and rear end closures 36 and 38 by means of suitable brackets 53, as best appears in Figs. 6 and 7, to work in said raceways, whereby to provide an anti-friction operating connection between the top 9 and the end closures 36 and 38, so that when the top 9 is raised by means of a handle 54, the adjacent end closure will automatically be raised with it, as illustrated in dotted lines in Fig. 5. The top is raised one end at a time, and suitable quickly operable sash fasteners are provided, as indicated at 55 in Fig. 7, to fasten the end closures in right angle relationship to the top 9, so that the one end closure will be securely anchored to the top before the other end of the top is raised, after which the other end closure at that end is fastened in a similar way. The sash fasteners 55 are of the well known rotary type cooperating with keepers 56 with a cam action to insure a tight connection and yet one which can be quickly and easily loosened. Stop blocks 57 are provided in the raceways 50, and are arranged to come into abutment with the rollers 52 to support the top against endwise movement when either end is raised, and to assist in guiding the top down onto the body in the folding of the trailer. Good rigidity of the structure in its unfolded condition is assured because the side closures 37 are designed to act as interlocking members, as illustrated in Fig. 6. The hinges 58 for these side closures 37 are especially designed and constructed to permit the side closures to have not only a hinging movement through about 90° to and from the vertical operative plane but also an endwise sliding movement in the operative plane to and from the interlocking position, the bearing portions 59 of the hinge butts being slidable on the pintles 60 carried on the attaching plates 61 to make such operation possible. A strip 62 is nailed, or otherwise suitably secured, to the front end portion of each of the side closures 37 to form a rabbet on the front end portions of the side closures to receive the side portions of the end closure, and when the side closures are slid forward to the point where the strips 62 come into abutment with the side portions of the front end closure 36 one or more hooks 63 are provided on the side closures entered in eyes 64 provided therefor on the end closure to fasten the side and end closures in rigid assembled relationship. In the sliding home of the side closures 37, slotted attachment plates 65 provided on the upper end portions of the side closures are moved into positions receiving bolts 66 in their horizontal slots 67, which bolts are provided projecting inwardly from the side portions 51 of the top 9, as clearly appears in Fig. 6, so that when wing nuts 68 threaded on the bolts 66 are tightened to clamp the plates 65, the structure is thereby further appreciably rigidified. The horizontal plane of the pintles 60 is sufficiently below the horizontal plane of the pintles 48, as clearly appears in Fig. 6, so that the side closures can be folded over the working top 35 under the end closure 36. The pintles 60 for the one side closure 37 are preferably in a horizontal plane slightly below the horizontal plane of the pintles 60 for the other side closure, so that the one side closure will fold neatly over the other.

In conclusion, attention is called to Figs. 1 and 8, in which a rectangular frame 69 is shown as secured to the bottom of the bed frame 11 and arranged to fit neatly in the opening 12 in the side wall of the trailer body when the bed is folded up, as shown, whereby to assume the major portion of the load of the bed and avoided placing too much strain upon the props 14 and their hinge connections 15 and 16. Finishing strips 70 of quarter-round improve the appearance of the trailer when the beds 10 and 11, thus equipped, are folded and their bottoms 71 form closure panels for the openings 12 in the sides of the trailer body, as shown in Figs. 1 and 8. An additional narrow cross-piece or cleat 72 is fastened onto the top portion of the frame 69 to define a rabbet 73, in which the lower edge portion of the side piece 51 of the top 9 is arranged to fit to make a weather-tight joint when the top is closed. Similar strips or cleats 74 are provided fastened to the front and rear end closures 36 and 38, as shown in Figs. 5–7, whereon the top 9 may rest and be clamped, as best appears in Fig. 7, so that the rollers 52 are clear of their tracks in the ways 50 and do not assume any of the load while the trailer is set up. The tops of the beds 10 and 11, in folded position, lie flush with the top of the front end portion of the body, as indicated in Fig. 1, for good support of the top 9 in its closed position. The same sash fasteners 55 used for fastening the top to the unfolded trailer structure, as above described, can be used in fastening the top securely onto the body in the closed position, whereby to eliminate likelihood of the top being jarred loose in traveling over rough roads. The keepers 56 for cooperation with the sash fasteners 55 in the closed position of the top are provided on the strips or cleats 75 that are fastened to the outside of the body 8 and lie in the same plane with the strips 72 on the beds in the folded positions of the latter. Thus a good weather-tight fit is assured for the top on all sides of the trailer.

It should be apparent from this description that I have provided a collapsible trailer of a practical and serviceable design. When folded and closed up ready for the road, the trailer is low enough in relation to the rear window 32 on the car ahead to afford unobstructed rear vision, which, of course, is quite an advantage from the safety standpoint. Moreover, the collapsed or folded trailer has such a low center of gravity that there is no danger of side sway as with the regular non-collapsible house-type trailers in going around sharp curves at high speeds. The ordinary hazards attached to traveling with trailers are, therefore, considerably reduced with a trailer of this design and construction. Of course, it is realized that a trailer of the non-collapsible type has the advantage of instant readiness for use when parked at a camp site. However, the trailer of my invention, as above described, is so constructed and designed that the unfolding and setting up for use should not take more than a few minutes, once the owner has become familiar with the routine. The tie-up of the end closures with the top makes it entirely feasible for one person to set up the trailer completely or fold it up ready for the road. The increased safety in operation of this type of trailer and generally its better roadability coupled with decreased weight are considered as more than offsetting the slight disadvantage of having to set it up and fold it again each time the trailer is used. Then, too, it goes without saying that since the trailer body proper is a small fraction of the size of the conventional house-type trailer body and the foldable extension pieces to complete the enlarged closure to house-type trailer height can be of light, cheap construction, a trailer of the present type may be manufactured at much lower cost and be accordingly available to a much larger number of prospects than the rigid non-collapsible house-type trailers. In this connection it is not out of place to mention that the laws which regulate trailers in various states and the operation of trailer camps are barring the use of toilet and bath facilities in trailers so that the house-type trailer, stripped of those facilities provides nothing more than eating and sleeping accommodations. The present type of trailer is, therefore, pretty much on a par with these others, since it provides good sleeping accommodations for four persons and room enough inside for the preparation and consumption of food.

It is believed the foregoing description conveys a good understanding of the objects and advantages of my invention. The appended claims have been drawn to cover all legitimate modifications and adaptions.

I claim:

1. In a structure of the class described, the combination of a body having side walls, a top raisable off the top portion of said side walls, side enclosures hinged to the side walls to swing upwardly into operative position extending between said body and said raisable top to support the raisable top in the latter's raised position, one of said side walls having an opening provided therein from the top downwardly, a bed frame extending lengthwise of said body and extensible sidewise therefrom through said opening to a horizontal operative position from its folded vertical position in the body, said bed frame in its folded vertical position closing said opening from the inside of the body and being disposed with the top portion thereof substantially in the same horizontal plane with the top portion of said side walls, so as to lie directly beneath the raisable top in its lowered closed position, means on the bottom of the bed frame adapted to rest on the side wall in the opening in the folded vertical position of the bed frame to support the bed frame on the side wall of the body, a bed frame supporting and guiding prop pivoted at one end to the bottom of said bed frame and at the other end to the outer side of the side wall of said body below the opening to guide said frame in its movement to and from folded position, and means on the bed frame arranged to engage the side wall to limit extension of the bed frame through the opening so as to support the bed frame in extended position at its inner end on the side wall while supported outwardly from the side wall on said prop.

2. A structure as set forth in claim 1, including another bed frame extending lengthwise of said body and hingedly connected along one longitudinal edge portion to a longitudinal edge portion of the other bed frame, so as to be foldable into superimposed relationship therewith and unfoldable into substantially coplanar relationship therewith, the second bed frame hanging on the first bed frame substantially parallel thereto in the folded vertical position of the bed frames, the second bed frame in extended operative position being supported on the first bed frame in the extended operative position thereof by the hinge connection, and said trailer including auxiliary supporting means for the second bed frame extensible from the outer end thereof to engage the ground therebeneath.

3. A collapsible house structure comprising a body, hinged end walls on said body swingable upwardly to vertical operative positions, a top slidably connected with the outer ends of the hinged end walls so that raising the top at either end raises the associated end wall, side walls hinged on said body to swing upwardly to vertical positions and slidable endwise relative to the body in their vertical positions, means providing rabbet joints for interfitting the end portions of said side walls with the side portions of one of said end walls, and detachable corner fastening means to hold the end and side walls thus interlocked, the side walls in sliding endwise relative to the body in their vertical positions moving toward one end wall and away from the other end wall, thereby moving out of obstructing relation to openings in the sides of the body adapted to accommodate bed frames, the structure including bed frames extensible from the body through the openings.

4. A collapsible house structure comprising a body, hinged end walls on said body swingable upwardly to vertical operative positions, a top having longitudinally extending roller raceways on the opposite side portions thereof receiving rollers mounted on the outer end portions of the end walls to provide operating connections between the top and end walls so that raising the top from either end raises the adjacent end wall, means on the end walls providing shoulders for support of the top on the end walls independently of the rollers, side walls hinged on said body to swing upwardly to vertical positions and slidable endwise relative to the body in their vertical positions, means providing rabbet joints for interfitting the end portions of said side walls with the side portions of one of said end walls, and detachable corner fastening means to hold the end and side walls thus interlocked, the side walls in sliding endwise relative to the body in their vertical positions moving toward one end wall and away from the other end wall, thereby moving out of obstructing relation to openings in the sides of the body adapted to accommodate bed frame, the structure including bed frames extensible from the body through the openings.

5. A collapsible house structure comprising a four-sided body structure, opposed walls hinged on said body to swing upwardly to vertical operative positions, a top having elongated roller raceways provided thereon receiving rollers mounted on the outer end portions of said hinged walls to provide operating connections between said top and hinged walls so that raising the top raises said hinged walls, means on said hinged walls providing shoulders for rigid support of the top on the end walls more or less independently of said rollers, other opposed walls hinged on said body to swing upwardly to vertical positions and slidable endwise relative to the body in their vertical positions, means providing rabbet joints for interfitting end portions of the latter hinged walls with end portions of the first named hinged walls, and detachable fastening means to secure the walls in such interfitting relationship.

6. A collapsible house structure as set forth in claim 5, including detachable fastening means for securing the outer end portions of the first named hinged walls in rigid substantially right angle relationship to the top.

7. A collapsible house structure as set forth in claim 5, including slotted attachment plates on the upper end portions of the second named hinged walls, which in the endwise movement of said walls receive in their bolts provided on the top to permit fastening said hinged walls in rigid substantially right angle relationship to the top, and nuts threaded on said bolts to clamp said plates in rigid relationship to the top.

8. A collapsible house structure as set forth in claim 5, including stops in the roller raceways for abutment with the rollers, said stops being located inwardly from the ends of the raceways distances approximately equal to the height dimension of the first named hinged walls.

9. A collapsible house structure as set forth in claim 5, including detachable fastening means to secure the top in rigid substantially right angle relationship to the first named hinged walls when the top is resting on the shoulders provided on said walls.

10. A collapsible house structure comprising a four-sided body part, a top part raisable off the body part, opposed walls hinged on one of said body and top parts to swing upwardly to vertical operative positions between the body and top parts, other opposed walls hinged to the same part with the first mentioned walls to swing upwardly to vertical positions between the top and body parts and slidable endwise relative to the body in their vertical positions, means providing rabbet joints for interfitting end portions of the latter hinged walls with end portions of the first named hinged walls, and detachable fastening means to secure the walls in such interfitting relationship.

11. A collapsible house structure as set forth in claim 10, including detachable fastening means for securing the outer end portions of the first hinged walls in rigid substantially right angle relationship to the top part.

12. A collapsible house structure as set forth in claim 10, including slotted attachment plates on the upper end portions of the second named hinged walls, which in the endwise movement of said walls receive in their slots bolts provided on the top to permit fastening said hinged walls in rigid substantially right angle relationship to the top, and nuts threaded on said bolts to clamp said plates in rigid relationship to the top.

13. A collapsible house structure as set forth in claim 10, including slotted attachment plates on one end portion of the second named hinged walls which in the endwise movement of said walls relative to the body receive in their slots bolts provided on one of the top and body parts to permit fastening said hinged walls in rigid substantially right angle relationship to that part, and nuts threaded on said bolts to clamp said plates in rigid relationship to that part.

FRANK F. KORS.

References Cited in the file of this patent

UNITED STATES PATENTS

| Number | Name | Date |
|---|---|---|
| 1,320,794 | Palmer et al. | Nov. 4, 1919 |
| 1,407,259 | Curtis | Feb. 21, 1922 |
| 1,435,251 | Moore | Nov. 15, 1922 |
| 1,484,522 | Moore | Feb. 19, 1924 |
| 2,182,967 | Kors | Dec. 12, 1939 |

FOREIGN PATENTS

| Number | Country | Date |
|---|---|---|
| 20,208 | Australia | Sept. 2, 1935 |
| 457,169 | Great Britain | Nov. 23, 1936 |